(12) United States Patent
Mitsui (10) Patent No.: US 9,507,544 B2
(45) Date of Patent: Nov. 29, 2016

(54) INFORMATION PROCESSING APPARATUS, RECORDING MEDIUM, AND CONTROL METHOD TO PROCESS PRINT DATA USING FILTERS

(71) Applicant: CANON KABUSHIKI KAISHA, Tokyo (JP)

(72) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/730,096

(22) Filed: Jun. 3, 2015

(65) Prior Publication Data
US 2015/0356384 A1 Dec. 10, 2015

(30) Foreign Application Priority Data
Jun. 6, 2014 (JP) ................................ 2014-118115

(51) Int. Cl.
*G06F 3/12* (2006.01)
(52) U.S. Cl.
CPC ..................................... *G06F 3/12* (2013.01)
(58) Field of Classification Search
CPC ........... G06K 15/181; G06K 15/1811; G06K 15/1815
See application file for complete search history.

(56) References Cited

U.S. PATENT DOCUMENTS

| 2009/0147308 A1* | 6/2009 | Hasegawa | G06F 17/2247 358/1.15 |
| 2009/0254810 A1* | 10/2009 | Mitsui | G06F 17/211 715/234 |
| 2009/0290185 A1* | 11/2009 | Shiohara | G06F 3/1208 358/1.13 |
| 2010/0079778 A1* | 4/2010 | Kohama | H04N 1/00204 358/1.9 |
| 2010/0128306 A1* | 5/2010 | Han | G06F 3/1246 358/1.15 |

FOREIGN PATENT DOCUMENTS

JP 2006-215879 A 8/2006

\* cited by examiner

*Primary Examiner* — Benjamin O Dulaney
(74) *Attorney, Agent, or Firm* — Canon USA, Inc. IP Division (57) ABSTRACT

An information processing apparatus operates in one of two modes. If it operates in a first mode, a first filter transmits print data to a second filter, and a third filter receives the print data from the second filter. If it operates in a second mode, the first filter transmits the print data to the second filter and stores the print data in a memory, and the third filter obtains the print data from the memory.

19 Claims, 9 Drawing Sheets

```
<FixedPage Width="793.76" Height="1122.56" xmlns="http://aaa.bbb.org/oxps/v1.0" xml:lang="und">
  <Path Data="F1 M 48,173.28 L 745.76,173.28" StrokeEndLineCap="Round" StrokeStartLineCap="Round" StrokeLineJoin="Round" StrokeThickness="0.5" Stroke="#ff000000"/>
  <Glyphs Fill="#ff00b0f0" UnicodeString="TEST" Indices="23854,77;23841,78;23856" OriginX="240.32" StyleSimulations="BoldSimulation" OriginY="167.68" FontRenderingEmSize="23.1816" FontUri="../Resources/Fonts/BF170770-51CD-4826-A06F-10CA0984A0AA.odttf" Clip="M 240.32,144 L 292.8,144 292.8,173.28 240.32,173.28 z"/>
</FixedPage>
```

```
<FixedPage Width="793.76" Height="1122.56" xmlns="http://aaa.bbb.org/oxps/v1.0" xml:lang="und">
  <Glyphs Fill="#ff000000" UnicodeString="XPS Mode" Indices="59;51;54;3;48;82;71;72" FontUri="../Resources/Fonts/D77271BF-8154-4F7A-BECB-47738A7CD558.odttf" OriginX="75.68" OriginY="124.32" />
</FixedPage>
```

FIG.9

INFORMATION PROCESSING APPARATUS, RECORDING MEDIUM, AND CONTROL METHOD TO PROCESS PRINT DATA USING FILTERS

BACKGROUND

Field

Aspects of the present invention generally relate to a technique for processing print data by using a filter.

Description of the Related Art

There has conventionally been a technique for implementing a plurality of functions for performing processing on data as a plurality of separate modules.

Japanese Patent Application Laid-Open No. 2006-215879 discusses a technique for providing filters serving as modules and performing processing by the respective filters.

SUMMARY

If a plurality of filters is configured to be used to perform processing on the print data in succession, feasible functions are determined by what filters are employed. The content of the processing successively performed by the filters may be unable to be changed.

An example of the case where the content of the processing is wanted to be changed is where if print data is processed by a certain filter, a printer output of the processed image data can cause a drawing failure depending on the type of the print data and the outputting printer. Then, the present specification further deals with a method for switching whether to convert print data by a filter according to a mode.

However, even with such a method, the filter for converting the print data may not be able to make a change such as a change of the processing content and a skip of the processing, depending on the printer vendor. As a result, it may be difficult to even switch the processing according to the mode. Japanese Patent Application Laid-Open No. 2006-215879 is not seen to discuss a drawing failure or a difficulty in switching a mode by a filter, similar problems therefore may be able to occur.

The present specification deals with a method for providing filters and processing print data by the filters, similar to Japanese Patent Application Laid-Open No. 2006-215879.

According to an aspect of the present invention, an information processing apparatus on which a printer driver configured to process print data via a filter runs includes a memory and a processor, wherein the processor communicates with the memory, the processor configured to control an acceptance unit configured to accept whether to operate in a first mode or a second mode, wherein if it is accepted to operate in the first mode, a first filter transmits the print data to a second filter, a third filter receives the print data from the second filter, and wherein if it is accepted to operate in the second mode, the first filter transmits the print data to the second filter and stores the print data in the memory, the third filter obtains the print data from the memory.

Further features of the present disclosure will become apparent from the following description of exemplary embodiments with reference to the attached drawings.

DESCRIPTION OF THE EMBODIMENTS

A first exemplary embodiment will be described. The present specification deals with a configuration in which, in a specific mode, print data is stored before processing of a predetermined filter, and the stored print data is processed by a subsequent filter instead of the print data processed by the preceding filter.

Figure 1:
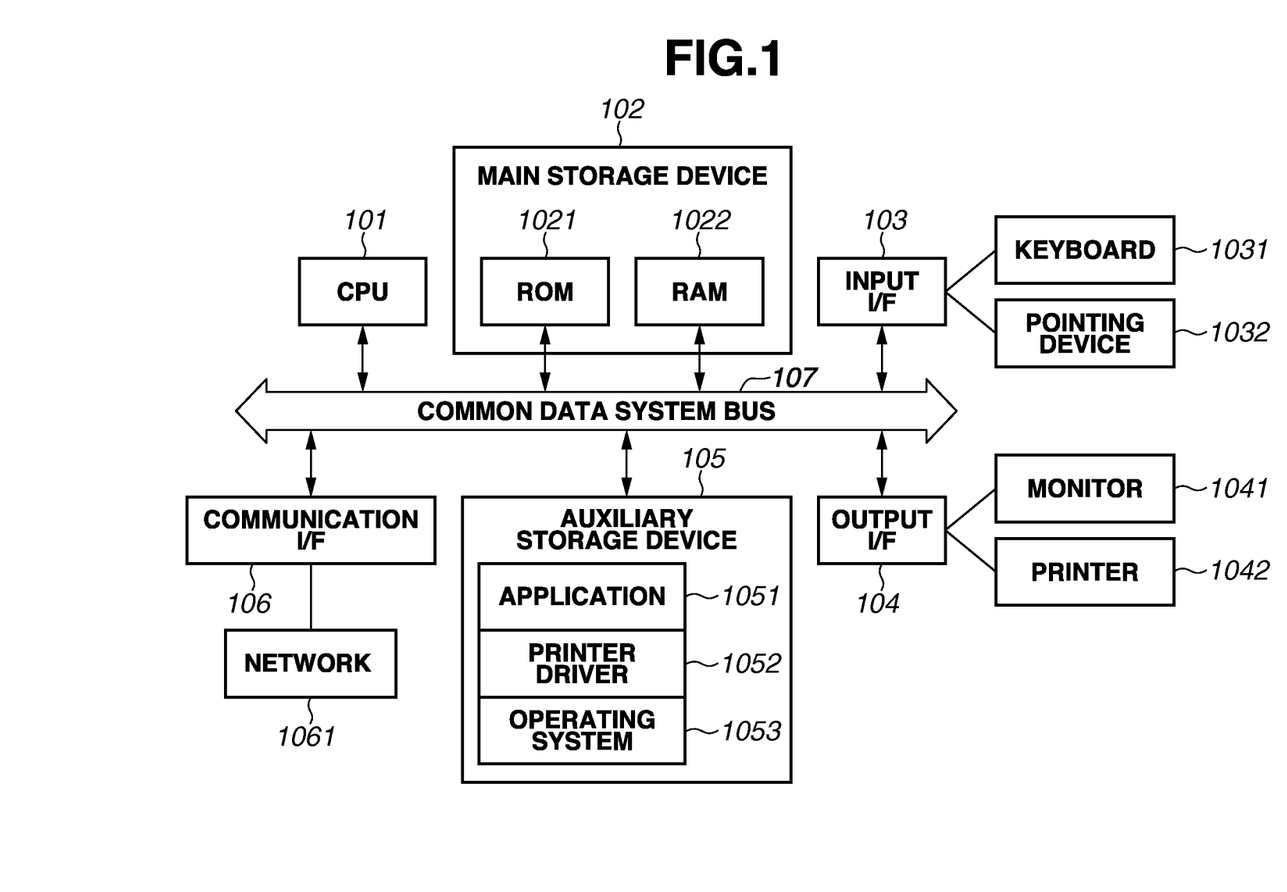
FIG. 1 is a block configuration diagram of hardware and software of a computer system.

FIG. 1 is a block configuration diagram illustrating a system of an information processing apparatus (computer) 100 according to the first exemplary embodiment. It will be understood that this exemplary embodiment may be applied, unless otherwise specified, to functions of a single apparatus, a system including a plurality of apparatuses, and a system that is connected and performs processing via a network as long as the functions of the exemplary embodiment are performed.

A central processing unit (CPU) 101 controls the entire information processing apparatus 100 according to a program stored in a read-only memory (ROM) 1021 or a random access memory (RAM) 1022 of a main storage device 102 or an auxiliary storage device 105. The CPU 101 further performs processing based on a program stored in the auxiliary storage device 105, whereby a software configuration of the information processing apparatus 100 illustrated in FIG. 3 and the processing of steps of flowcharts to be described below are implemented. The RAM 1022 is also used as a work area when the CPU 101 performs various types of processing. An application 1051, a printer driver 1052, and an operating system (OS) 1053 are recorded in the auxiliary storage device 105. Input devices including a keyboard 1031 and a pointing device 1032, typified by a mouse and a touch panel, are devices for the user to give various instructions to the computer 100 via an input interface (I/F) 103. An output I/F 104 is an interface for outputting data to the outside. The output I/F 104 outputs data to output devices such as a monitor 1041 and a printer 1042. The information processing apparatus 100 may be connected with the printer 1042 not only through a direct connection of local input/output (I/O), but also via a network 1061 which is connected via a communication I/F 106. A common data system bus 107 exchanges data between the I/Fs and modules. The printer 1042 may be a printing apparatus having only a print function, a facsimile (FAX) apparatus having only a FAX function, or a multifunction peripheral having a plurality of functions including a scan function and a print function. The printer 1042 may be referred to as an image processing apparatus.

Figure 2:
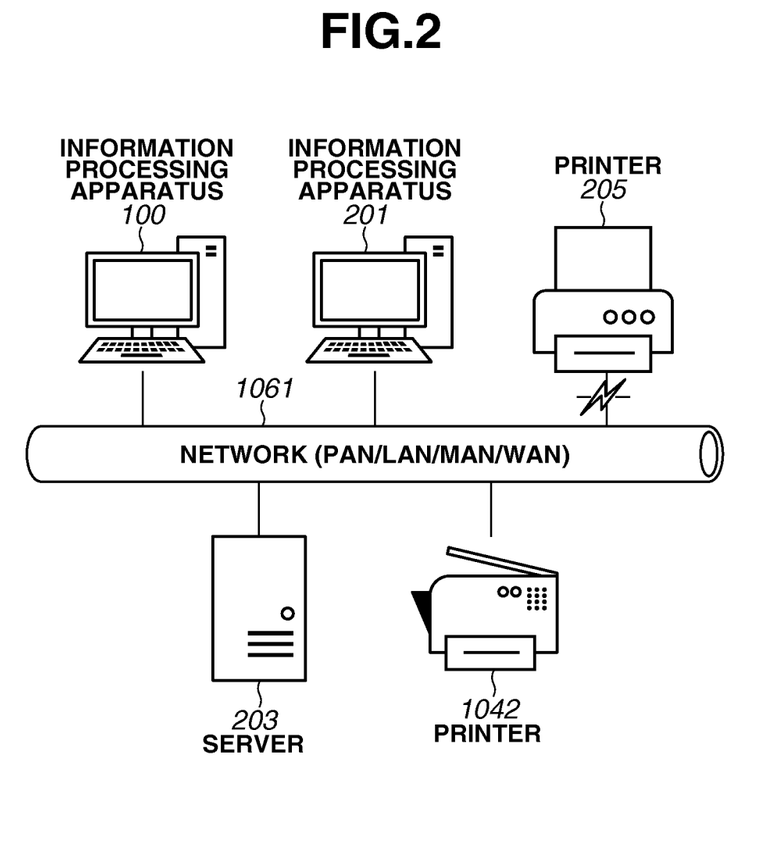
FIG. 2 is a configuration diagram illustrating a network to which clients, a server, and printers are connected.

FIG. 2 is a diagram schematically illustrating an environment of the network 1061 according to the first exemplary embodiment.

The information processing apparatus 100 and an information processing apparatus 201 which generate documents and images to be printed are connected to the network 1061. Users of the information processing apparatuses 100 and 201 and/or a server 203 may also be connected to the network 1061. A printer 205 and the printer 1042 are further connected to the network 1061.

The printer 205 is illustrated to be in an offline state where the printer 205 is physically connected to the network 1061 but actually not usable. The network 1061 may include small- to large-scale networks such as a personal area network (PAN), a local area network (LAN), a metropolitan area network (MAN), and a wide area network (WAN).

Figure 3:
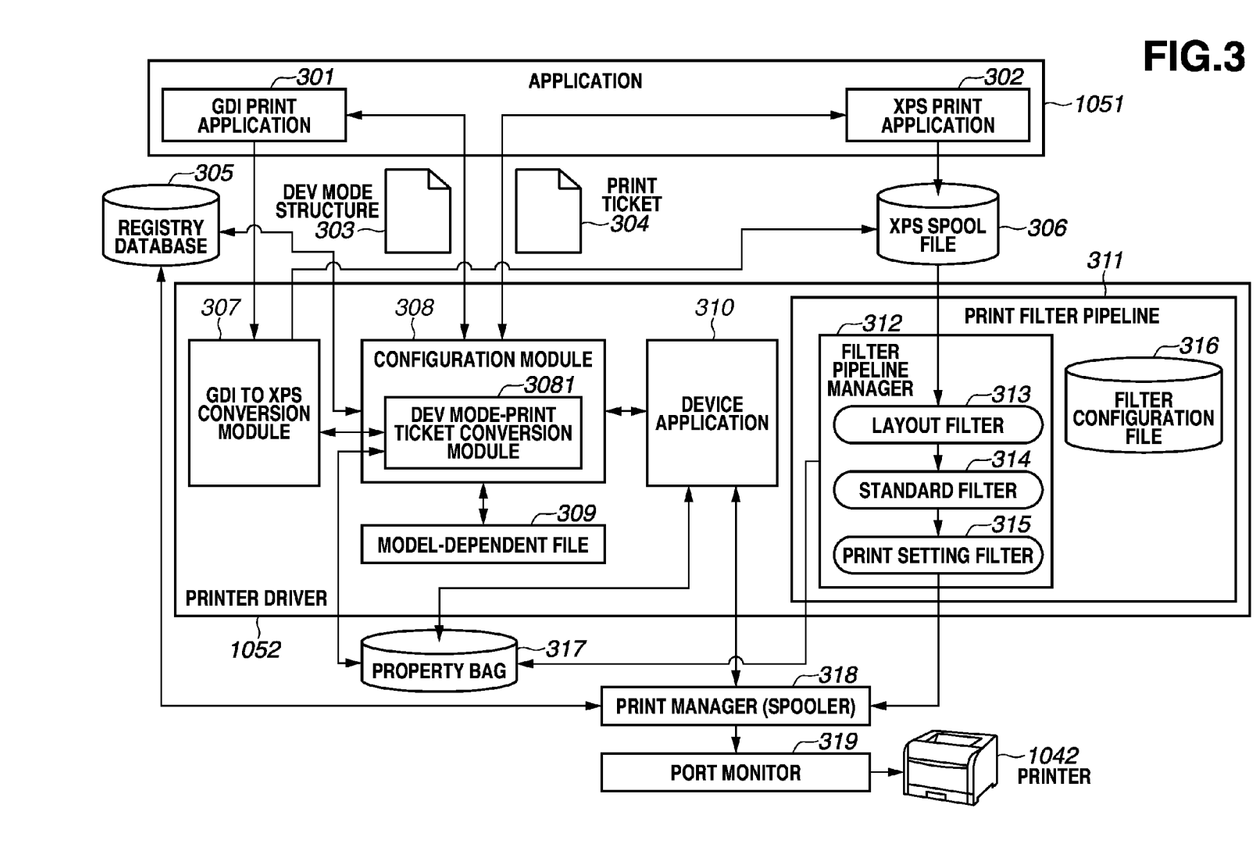
FIG. 3 is a block configuration diagram of a version 4 (V4) printer driver printing system.

FIG. 3 is a block configuration diagram of a version 4 (V4) printer driver printing system. The V4 printer driver printing system performs printing by using a file format that is called Extensible Markup Language (XML) Paper Specification (hereinafter, abbreviated as XPS) as spool data. In FIG. 3, the application 1051 and the printer driver 1052 are software components stored in the auxiliary storage device 105. The application 1051 and the printer driver 1052 are loaded into the RAM 1022 at execution time and executed by the CPU 101. The V4 printer driver printing system runs on the operating system 1053.

A Graphics Device Interface (GDI) to XPS conversion module 307, a filter pipeline manager 312, and a standard filter 314 are modules included in the printer driver 1052. Such modules and a print manager 318 are modules provided by the operating system 1053 at the same time. Among these modules, the standard filter 314 is an XPS filter provided by Microsoft® Corporation. The standard filter 314 is used to generate page description languages of Printer Command Language (PCL) and PostScript® (PS) by a V4 printer driver. Specifically, the standard filter 314 receives print data (XPS spool file) from the immediately preceding filter, and converts the print data into PCL® or PS print data.

The printer driver 1052, which includes filters 313 to 315 of the filter pipeline manager 312, and a device application 310, is stored in the auxiliary storage device 105 of FIG. 1. The device application 310 is automatically installed via the network 1061 in response to the installation of the printer driver 1052. A GDI print application 301 (hereinafter, abbreviated as GDI application) and an XPS print application 302 (hereinafter, abbreviated as XPS application) are stored in the auxiliary storage device 105 of FIG. 1 as the application 1051. The GDI application 301 performs printing by using a GDI provided by the operating system 1053. The XPS application 302 performs printing by directly using an XPS spool file 306. The user uses input devices such as the keyboard 1031 and the touch panel or mouse 1032 to give instructions for print processing from the GDI application 301 or the XPS application 302 displayed on the monitor 1041 which is an output device. The print processing is implemented by performing three processes "selection of a printer," "generation of print setting data," and "conversion of drawing data" in order. A flow of the print processing will be described below.

Initially, the user selects the printer 1042 to perform printing. When viewed from the perspective of the user, selecting the printer 1042 is synonymous with selecting the printer driver 1052 corresponding to the printer 1042 to perform printing.

Next, print setting data is generated. When generating print setting data, the application 1051 reserves a memory area for print setting data in the RAM 1022. The application 1051 then calls a configuration module 308 of the printer driver 1052 to generate and store print setting data. The GDI application 301 uses a binary development mode (DEV MODE) structure 303 as the print setting data. The XPS application 302 uses a print ticket 304 written in the markup language XML.

The DEV MODE structure 303 includes a standard area defined by the operating system 1053 and an expanded area uniquely defined by the printer driver 1052. The print ticket 304 is print setting data written in an XML format, in which a standard area and an expanded area are described separately by a namespace. The print setting data includes model-inherent information. The configuration module 308 therefore uses a model-dependent file 309 to generate the print setting data. The application 1051 changes a print setting by rewriting the contents of the DEV MODE structure 303 or the print ticket 304.

The print setting data includes setting values needed for printing, such as information about the size of a sheet to output (for example, "A4"), designation about two-sided printing, whether color or monochromatic, and designation about a sheet feed stage. Since the specifications of the standard area of the print setting data are made public, the application 1051 can directly change the standard area. The detailed specifications of the expanded area dependent on the printer 1042 are known only to the printer driver 1052. The expanded area is thus usually set by the user by using a user interface of the device application 310. Unlike the DEV MODE structure 303, the setting values of the print ticket 304 are written in an XML format. The XPS application 302 can thus directly change and rewrite all the setting values. However, since the expanded area is uniquely defined by each printer driver 1052, the detailed specifications are not known to the XPS application 302. The specifications vary depending on each printer 1042. It is therefore easier to change the setting values by using the user interface of the device application 310. In such a manner, the printer driver 1052 and the device application 310 change and determine the print settings. As a result, the print setting data is finalized.

The device application 310 is a part of the printer driver 1052, but is installed as a program different from the printer driver 1052. The device application 310 exchanges the print setting data with the printer driver 1052 by using the print ticket 304.

Finally, conversion of drawing data is performed. The drawing data refers to data on graphics drawn on each page of print data such as the XPS spool file 306. The print data refers to data that includes drawing data page by page and is to be processed by a filter or filters. As employed herein, the XPS spool file 306 and standard page description language (PDL) data are print data.

After the print setting data is finalized by the printer driver 1052, the user gives an instruction for print processing from the application 1051. If the GDI application 301 performs the printing, the drawing data is transmitted to the GDI to XPS conversion module 307, whereby the XPS spool file 306 is generated.

If the XPS application 302 performs the printing, there are two methods. In one method, the XPS application 302 itself generates the XPS spool file 306. In the other method, the operating system 1053 generates the XPS spool file 306 according to drawing instructions from the XPS application 302. In either method, the XPS spool file 306 is generated in the process of printing. In such a manner, the V4 printer driver printing system generates the XPS spool file 306 during printing.

After the generation of the XPS spool file 306, the processing is passed to a print filter pipeline 311. The print filter pipeline 311 includes a mechanism for performing print processing by causing print data to pass through a plurality of filters. A filter configuration file 316 controls the number and order of filters. According to the filter configuration file 316, the filter pipeline manager 312 running on the printer filter pipeline 311 performs processing in order of, in the present exemplary embodiment, the layout filter 313 (corresponding to a first filter), the standard filter 314 (corresponding to a second filter), and the print setting filter 315 (corresponding to a third filter). The number and types of filters vary depending on the configuration of the filter driver 1052, are not limited to the above-listed filters. For example, in addition to the three filters 313 to 315 of FIG. 3, a filter for encrypting the print data may be included.

The print processing is performed by causing the XPS spool file 306 to pass through the filters. Each filter processes and transmits the XPS spool file 306 to the next filter to proceed with the processing. The print data, such as the XPS spool file 306, is finally converted into a print job and transmitted to the printer 1042. The printer 1042 can interpret the print job. The printer 1042 interprets the transmitted print job to perform the print processing based on the print job.

Each filter can store unique data into a property bag 317, which is a data storage area. Each filter can not only store unique data into the property bag 317, but can also obtain information about the operating system 1053 and data on other filters from the property bag 317.

The layout filter 313 performs processing about layout. Examples of the processing include, but are not limited to, a magnification change, a binding imposition layout, and stamping. The layout filter 313 operates according to the print ticket 304 included in the XPS spool file 306. If the print ticket 304 does not include an imposition setting, the layout filter 313 performs no processing on the print data and transmits the XPS spool file 306 to the subsequent standard filter 314.

The standard filter 314 renders and converts the input XPS spool file 306 into data of a standard PDL which is a PDL different from XPS. The standard filter 314 also converts the settings of the standard area in the print setting data of the print ticket 304 into Printer Job Language (hereinafter "PJL"). The standard filter 314 collectively transmits the standard PDL data and the PJL data to the subsequent print setting filter 315 as a stream. The stream refers not to the files stored part by part, but to a collective ZIP-compressed file of the parts.

The final print setting filter 315 converts the settings of the expanded area in the print setting data of the print ticket 304 into PJL. The print setting filter 315 collectively transmits the converted PJL data and the standard PDL data and the PJL data transmitted thereto to the filter pipeline manager 312 as a print job. The print job is then transmitted to the print manager 318 which performs schedule management for print processing. In such a manner, print jobs are successively registered into a queue. The print manager 318 communicates with the printer 1042, and as soon as the printer 1042 becomes ready to print, transmits the print jobs via a port monitor 319 in order of registration in the queue.

Such conversion of the print data and the print setting data into a print job is the main role of the printer driver 1052. The print processing of the information processing apparatus 100 is thereby implemented.

Figure 4:
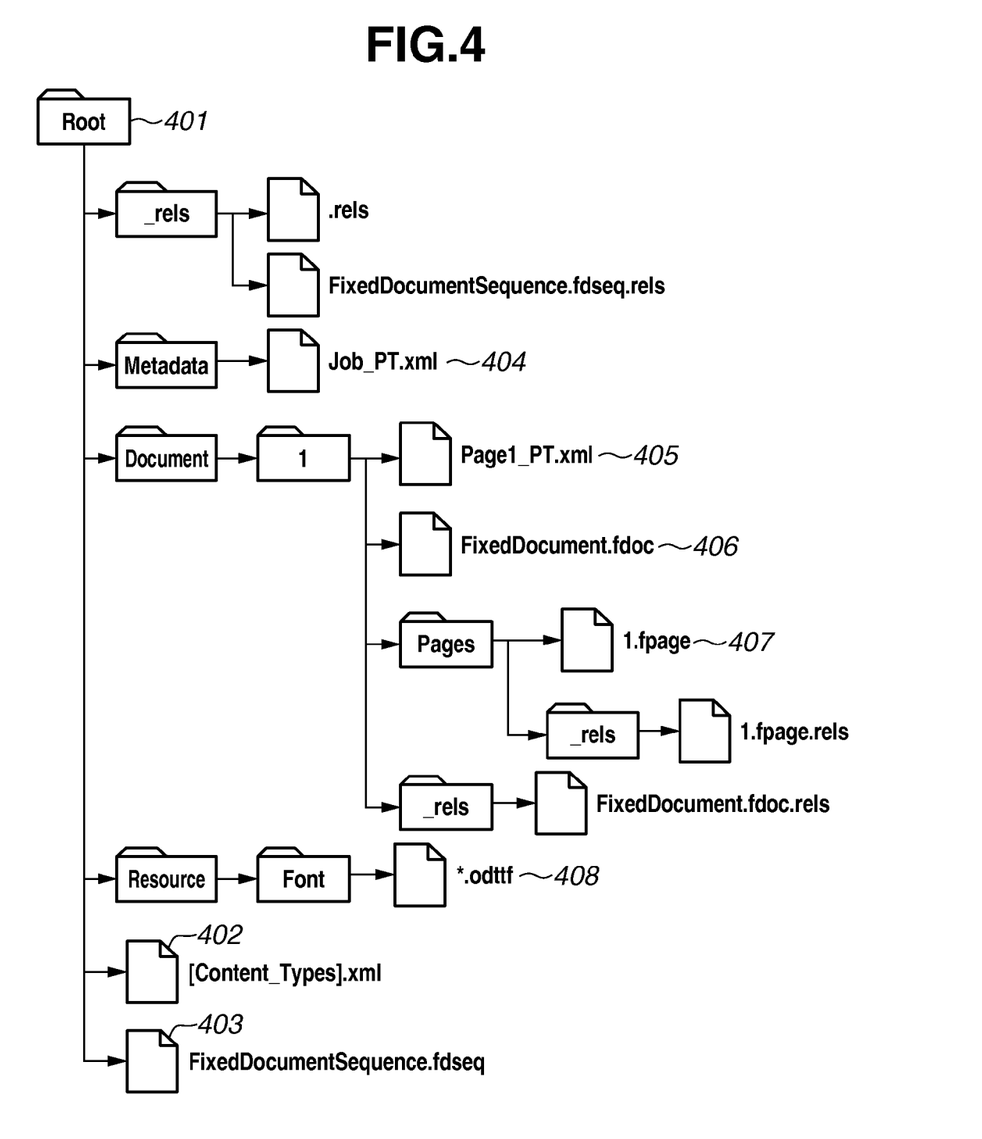
FIG. 4 illustrates an internal configuration of an Extensible Markup Language (XML) Paper Specification (XPS) spool file used as drawing data of a V4 printer driver.

FIG. 4 illustrates an internal structure of the XPS spool file 306. The XPS spool file 306 has a tree structure that begins with a Root 401 and includes folders, XML files, and binary resources. The XML files included in the XPS spool file 306 are broadly classified into rels files and other files. The rels files describe association (relationship) about what role each of the XML files has. The other files will be described below.

Figure 5:
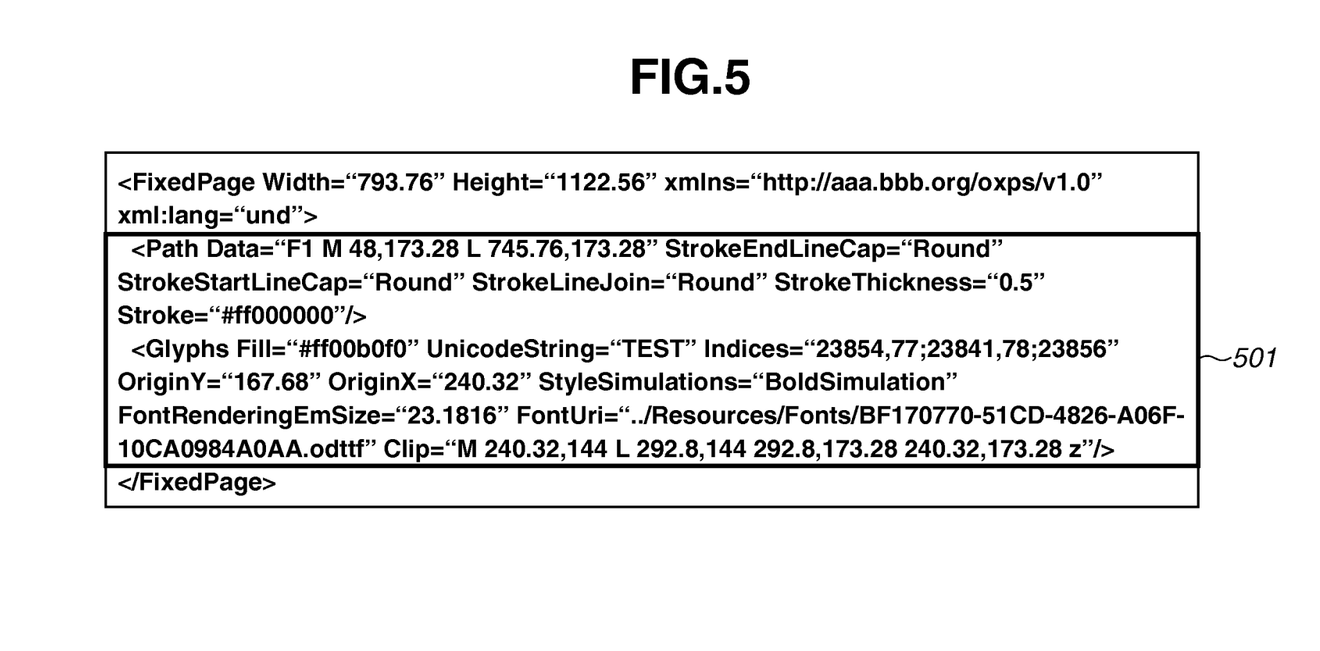
FIG. 5 illustrates an example of FixedPage which describes a page of drawing data included in the XPS spool file.

"[Content_Types].xml" 402 establishes associations of the types of binary data files other than the XML files included in resource data. "FixedDocumentSequence.fdseq" 403 indicates a document included in the XPS spool file 306. Here, the "FixedDocumentSequence.fdseq" 403 indicates "FixedDocument.fdoc" 406. "Job_PT.xml" 404 is a print ticket of the entire print job. The "FixedDocument.fdoc" 406 indicates a page or pages included in the document of the XPS spool file 306 itself. Here, there is only one page, and the "FixedDocument.fdoc" 406 indicates "1.fpage" 407. The "1.fpage" 407 is a page of drawing data called FixedPage. FIG. 5 illustrates the XML of the "1.fpage" 407. In FIG. 5, a section 501 constitutes the actual drawing data. "*.odttf" 408 is font data. Font data to be used when displaying characters is embedded in the "*.odttf" 408 in the form of a subset extracting as much as the used characters. Image data of the drawing data may also be stored as resource data.

As described above, the XPS spool file 306 includes a large number of small parts. When the parts are transmitted between filters as a stream, the parts are collectively ZIP-compressed into a file with reduced size.

Next, a unit for switching between a method of using the standard PDL data output by the standard filter 314 and a method of directly transmitting the XPS spool file 306 to the printer 1042 without using the standard PDL data output by the standard filter 314 will be described. Such a unit is particularly characteristic of the present specification. The unit will be described with reference to the flowchart of the layout filter 313 in FIG. 6 and the flowchart of the print setting filter 315 in FIG. 7.

The processing of the layout filter 313 will initially be described with reference to FIG. 6.

In step S601, the layout filter 313 receives the parts of the XPS spool file 306 from the filter pipeline manager 312 provided by the operating system 1053. The filter pipeline manager 312 segments the XPS spool file 306 into the parts illustrated in FIG. 4. The layout filter 313 receives the segmented XPS spool file 306 part by part.

Whether a filter simply receives the XPS spool file 306 as a whole or receive the segmented XPS spool file 306 in parts may be described and specified in the filter configuration file 316. In the present exemplary embodiment, the filter configuration file 316 describes that the layout filter 313 receives segmented parts.

In step S602, the layout filter 313 checks the settings of the print ticket 304 of the received parts. In step S603, the layout filter 313 performs layout processing. The layout processing refers to processing of drawing data. Examples include N-up for reducing and laying out a plurality of pages in one page, and putting a stamp on a page. The layout filter 313 adds the drawing data of FixedPage in FIG. 5 based on the print settings described in the print ticket 304.

In step S604, the layout filter 313 determines whether the current mode is an XPS mode or a standard PDL mode based on the print settings described in the print ticket 304 which is the print setting data. The layout filter 313 can determine the mode described in the print ticket 304 to find out which mode is set by the printer driver 1052 and the device application 310. As employed herein, the print settings of the print thicket 304 include a feature for specifying a "drawing output mode," whereby either one of the XPS mode and the standard PDL mode is specified as the drawing output mode. In other words, in step S604, the layout filter 313 determines whether the XPS mode is specified as the drawing output mode of the print ticket 304.

If the current mode is the XPS mode (YES in step S604), then in step S605, the layout filter 313 stores the parts of the XPS spool file 306 into a temporary folder 320 on the auxiliary storage device 105. The temporary folder 320 is managed by the operating system 1053. The parts are stored as respective files in the temporary folder 320. Print tickets in units of pages is stored in the temporary folder 320. Print tickets in units of documents or in units of jobs are not stored in the temporary folder 320. The reason is that the print tickets in units of documents and those in units of jobs are transmitted to the print setting filter 315 via the standard filter 314. The print tickets in units of documents and those in units of jobs may be configured to be stored in the temporary folder 320.

Figure 9:
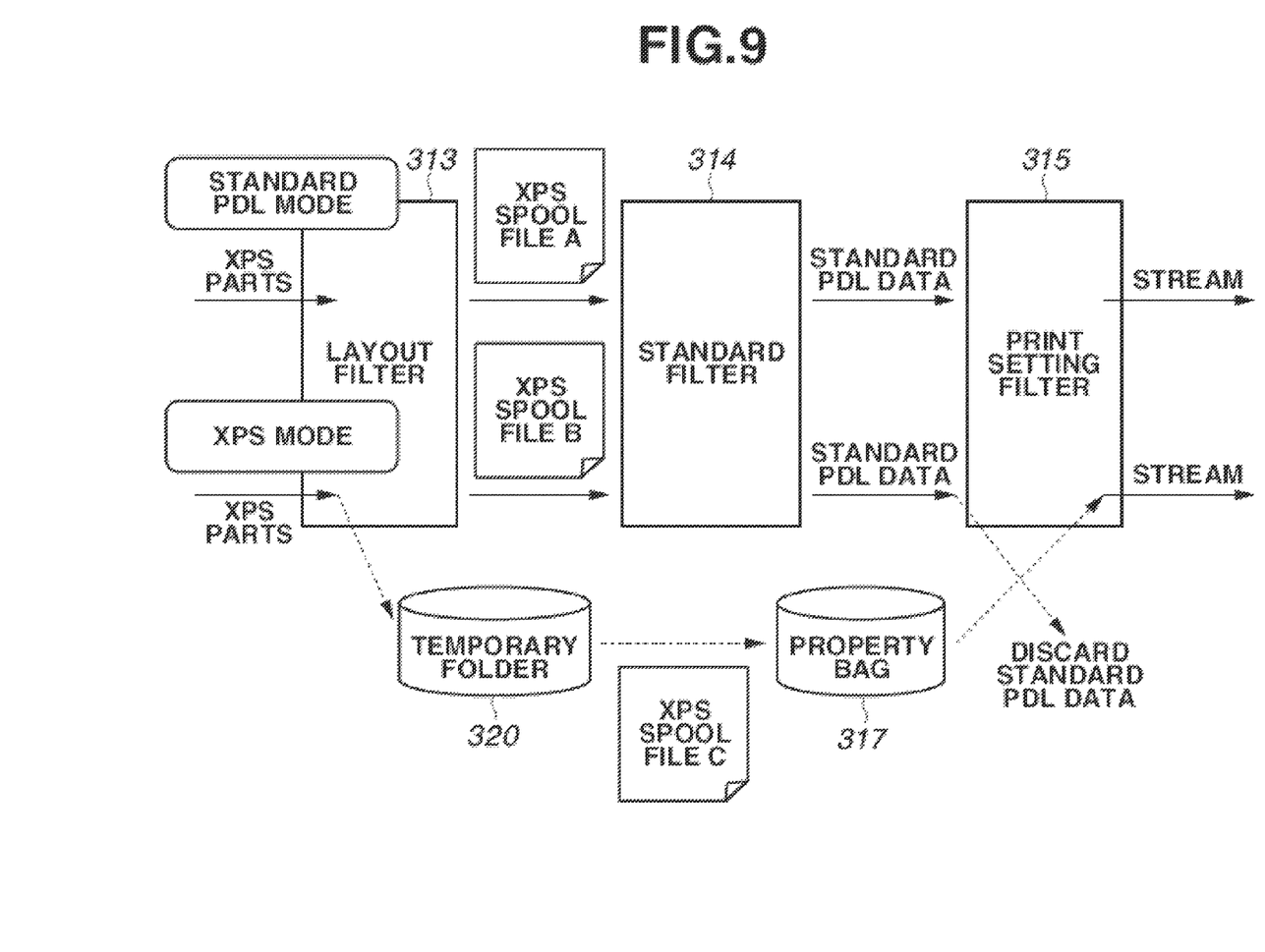
FIG. 9 is a diagram illustrating a flow of print data in two modes.

FIG. 9 is a diagram for describing a flow of print data in the standard PDL mode and the XPS mode in detail. In FIG. 9, an XPS spool file C represents the XPS spool file 306, which is print data, stored in the temporary folder 320 and the property bag 317 in step S605 and in step S609 to be described below.

In step S606, the layout filter 313 deletes drawing data from the "1.fpage" 407 which is FixedPage of the XPS spool file 306 received from the operating system 1053. Specifically, the layout filter 313 modifies the "1.fpage" 407 into an XML in which the entire section 501 of FIG. 5 is deleted. In FIG. 9, an XPS spool file B represents the XPS spool file 306 from which the drawing data is deleted in step S606 and which is the print data to be transmitted to the standard filter 314 in step S607 to be described below. The processing of step S606 eliminates the drawing data from FixedPage of the XPS spool file B to generate a blank page. Since the drawing data of the XPS spool file C stored in the temporary folder in advance is not modified, the printing system does not lose the original drawing data.

In step S607, the layout filter 313 transmits the parts of the XPS spool file 306 including the parts that correspond to the blank pages (XPS spool file B) to the subsequent standard filter 314.

In such a manner, the layout filter 313 processes all the parts. In step S608, having stored all the parts, the layout filter 313 ZIP-compresses the stored parts and the entire folders to generate a stream of the XPS spool file 306. Without the layout processing of the layout filter 313 in step S603, the resulting XPS spool file 306 would be the same as the original XPS spool file 306 received by the layout filter 313 in step S601 except the print ticket 304 and whether it includes parts or a stream. The layout filter 313 performs the layout processing before storing the parts into the temporary folder because the layout-processed XPS spool file 306 is to be used both in the XPS mode and the standard PDL mode.

In step S609, the layout filter 313 stores the XPS spool file 306, i.e., the generated print data into the property bag 317 serving as a storage area.

If the current mode is the standard PDL mode (NO in step S604), then in step S610, the layout filter 313 transmits the parts of the XPS spool file 306 to the subsequent standard filter 314. In FIG. 9, an XPS spool file A represents the XPS spool file 306 transmitted to the standard filter 314 in step S610. As described in step S605, a substantial difference between the XPS spool file A and the XPS spool file C, except whether the XPS spool file includes parts or a stream, is whether print tickets in units of documents and in units of jobs are included. If the XPS spool file C is configured to include print tickets in units of documents and in units of jobs, there is no substantial difference between the XPS spool files A and C.

The standard filter 314 converts the parts of the XPS spool file 306 received from the layout filter 313 into standard PDL data. The standard filter 314 converts only the print setting information in units of pages included in the print ticket 304 into PJL data, and transmits the PJL data to the subsequent print setting filter 315 along with the standard PDL data. The standard filter 314 stores the print ticket 304 into the property bag 317.

If the layout filter 313 is operating in the XPS mode, the drawing data that the standard filter 314 receives when converting the drawing data into the standard PDL data has been all made data corresponding to blank pages by the layout filter 313. This reduces the amount of data for the standard filter 314 to convert into the standard PDL data. As a result, the standard filter 314 can process the print data at high speed.

Next, the processing of the print setting filter 315 will be described with reference to the flowchart of FIG. 7. In step S701, the print setting filter 315 receives the stream of the standard PDL data processed by the standard filter 314.

In step S702, the print setting filter 315 obtains the print ticket 304 stored by the standard filter 314 in the property bag 317, and checks the print settings.

In step S703, the print setting filter 315 determines whether the current mode is the XPS mode based on the print settings of the print ticket 304. The determination method is the same as that of step S604. A detailed description thereof will thus be omitted.

If the current mode is the XPS mode (YES in step S703), then in step S704, the print setting filter 315 obtains the XPS spool file 306 stored by the layout filter 313 from the property bag 317.

In step S705, the print setting filter 315 generates PDL data to be output to the printer 1042 from the obtained XPS spool file 306. The PDL data is data which is divided into packets and to which a command for the printer 1042 to process is added.

In step S706, the print setting filter 315 deletes the stream of the standard PDL data output by the standard filter 314.

In step S707, the print setting filter 315 generates PJL data from the settings in units of jobs and in units of documents included in the print settings of the print ticket 304.

In step S708, the print setting filter 315 combines the PJL data and the PDL data generated in step S705 to generate a print job, and transmits the print job to the printer 1042.

If the current mode is not the XPS mode (NO in step S703), then in step S709, the print setting filter 315 generates PDL data to be transmitted to the printer 1042 from the stream received from the standard filter 314.

In such a manner, despite the use of the standard filter 314 which is capable of generating only a standard PDL data, the layout filter 313 (first filter) and the print setting filter 315 (third filter) can implement the XPS mode in which PDL data is generated from the XPS spool file 306 and transmitted to the printer 1042. Consequently, even if the user wants to print data that causes a drawing failure when the standard filter 314 is used, the user can easily avoid the drawing failure by changing the print setting to and performing printing in the XPS mode.

A second exemplary embodiment will be described. In FIG. 6 of the first exemplary embodiment, in step S609, the layout filter 313 stores the XPS spool file 306 into the property bag 317. Storing the XPS spool file 306 into the property bag 317 needs a copy time according to the size of the XPS spool file 306. Depending on the data drawn by the application 1051, the XPS spool file 306 may have an extremely large size, in which case the XPS spool file 306 needs a long time to store it into the property bag 317.

The layout filter 313 then stores only information about a path to the XPS spool file 306 into the property bag 317 while leaving the generated XPS spool file 306 in the temporary folder used to generate the XPS spool file 306. In step S704, the print setting filter 315 obtains the information about the path from the property bag 317, and obtains the XPS spool file 306 from the obtained path.

With such a configuration, the layout filter 313 is prevented from storing data of large size into the property bag 317. This improves performance.

Figure 6:
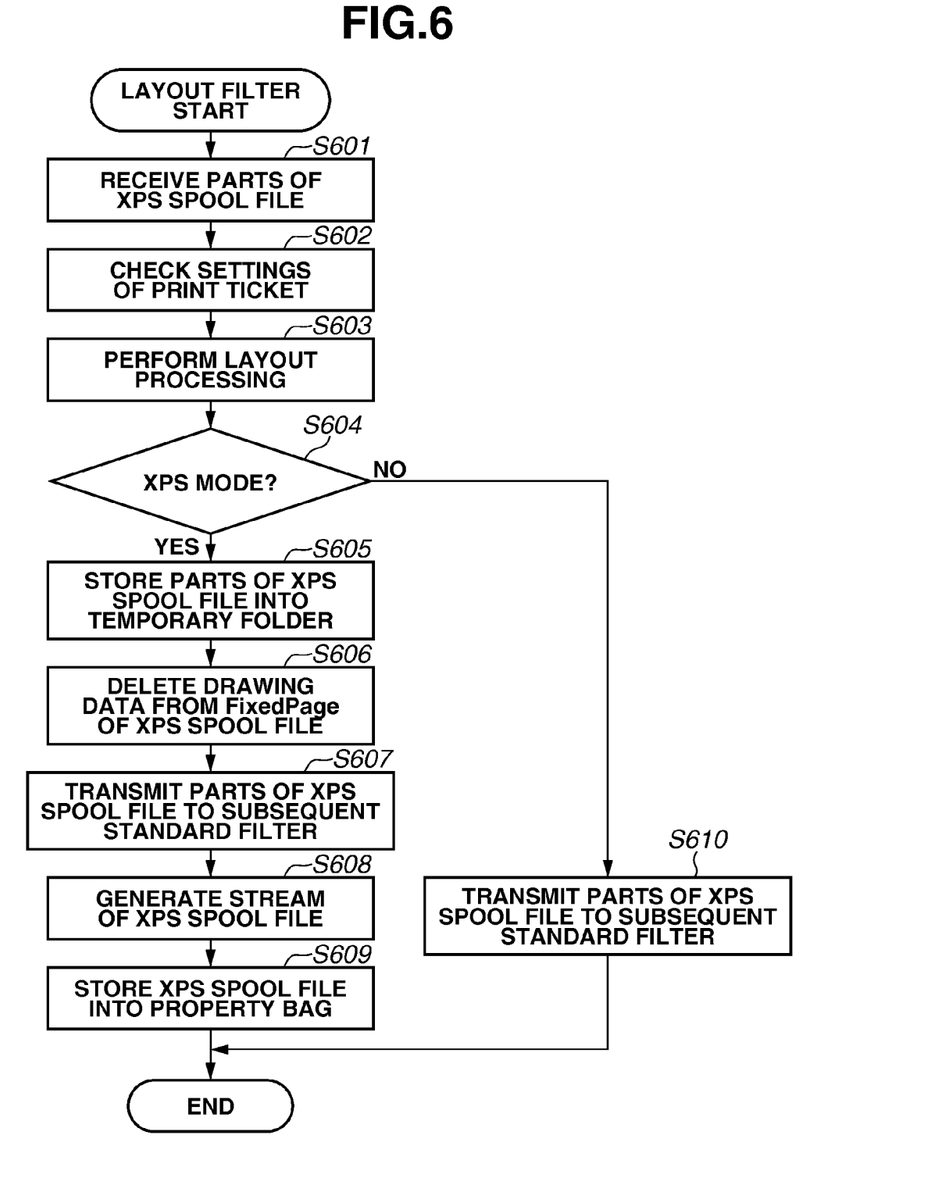
FIG. 6 is a flowchart of a layout filter of the V4 printer driver in an XPS mode.

In FIG. 6 of the first exemplary embodiment, in step S605, the layout filter 313 stores the parts of the XPS spool file 306 into the temporary folder. If the main storage device 102, i.e., a memory has a large capacity, the layout filter 313 may be configured to hold the parts in the memory without storing the parts into the temporary folder. Holding the parts in the memory can reduce the time for the layout filter 313 to spend for input/output from/to the main storage device 102. This can improve performance.

A third exemplary embodiment will be described. In FIG. 6 of the first exemplary embodiment, in step S606, the layout filter 313 deletes the drawing data of FixedPage to generate a blank page. The third exemplary embodiment deals with a configuration for inserting dummy data.

Figure 8:
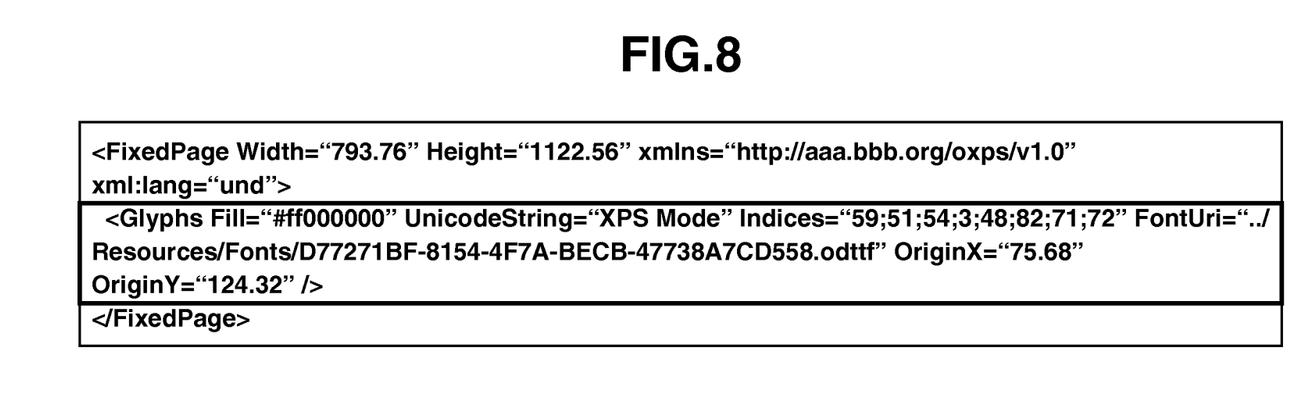
FIG. 8 illustrates a sample of an XML of FixedPage in which drawing data is replaced with dummy data.

For example, as illustrated in FIG. 8, the drawing data of FixedPage is replaced with text "XPS Mode" which is dummy data. Since characters are replaced, a corresponding font is added as resources, and all the other resources are deleted. A plurality of pages may be changed to one page to reduce the number of pages. As a result, the pages for the standard filter 314 to draw decrease with an improvement in performance.

Figure 7:
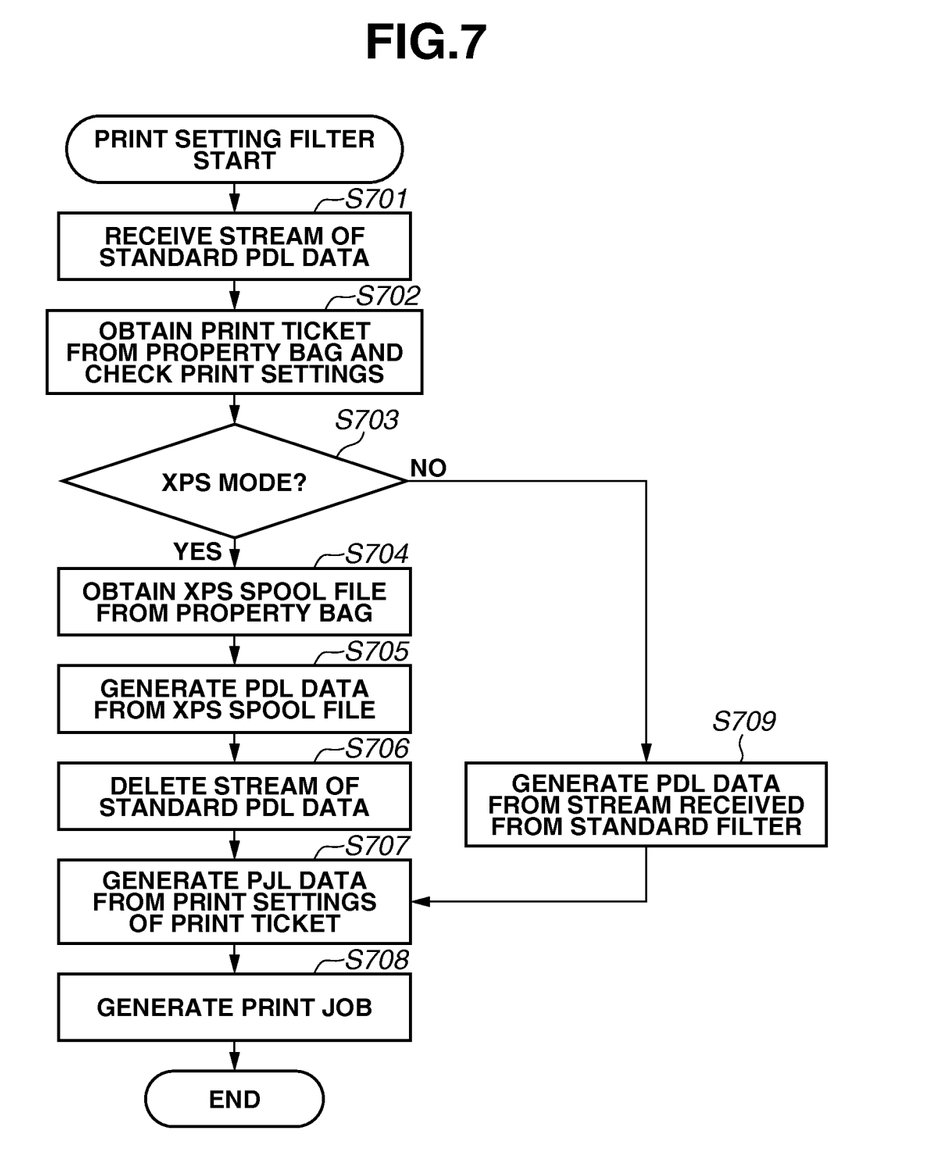
FIG. 7 is a flowchart of a print setting filter of the V4 printer driver in the XPS mode.

The replacement of the drawing data with the dummy data eliminates the need for the print setting filter 315 to obtain the print ticket 304 from the property bag 317 in step S702 of FIG. 7. Specifically, according to the first exemplary embodiment, in step S703, the print setting filter 315 determines whether the current mode is the XPS mode based on the print ticket 304.

According to the present exemplary embodiment, whether the current mode is the XPS mode or the standard PDL mode can be determined based on whether the stream includes the text of the dummy data. This eliminates the need to make a determination based on the print ticket 304 in step S703. Determining whether the stream includes the text of the dummy data is more efficient than interpreting the XML data of the print ticket 304. As a result, the performance of the print setting filter 315 can also be improved.

In FIG. 6 of the first exemplary embodiment, in step S702, the print setting filter 315 obtains the print ticket 304 from the property bag 317 and checks the print settings. However, whether the current mode is the XPS mode may be determined by checking the property bag 317 for the XPS spool file 306. Like the foregoing configuration, the print setting filter 315 therefore does not need to obtain the print ticket 304 from the property bag 317 in step S702 of FIG. 7. Consequently, the property bag 317 needs to be accessed only once to obtain (check the presence or absence of) the XPS spool file 306. This can improve performance.

(Other Exemplary Embodiments)

Examples of switching between the standard PDL mode and the XPS mode by using the standard filter 314 which makes output in PCL (registered trademark) or PS (registered trademark) have been described herein. However, the formats of the print data are not limited to the combination of PCL (registered trademark), PS (registered trademark), and XPS. For example, the filters may be configured to usually exchange the print data in a Portable Document Format (PDF) format. The standard filter 314 may include a function of converting PDF into XPS. With such a combination, the foregoing exemplary embodiments can be applied to switch between two types of modes, a PDF mode and an XPS mode.

According to an exemplary embodiment of the present disclosure, a printing system convenient to the user can be provided.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-118115, filed Jun. 6, 2014, which is hereby incorporated by reference herein in its entirety.

What is claimed is:

1. An information processing apparatus on which a printer driver configured to process data via a filter runs, the information processing apparatus comprising:
a memory; and
a processor, wherein the processor communicates with the memory, the processor configured to control:

an acceptance unit configured to accept whether to operate in a first mode or a second mode, wherein, if it is accepted to operate in the first mode, a first filter transmits a print file to a second filter configured to convert the print file into print data, and a third filter receives the print data from the second filter, and wherein, if it is accepted to operate in the second mode, the first filter stores the print file in a storage area, and the third filter receives from the second filter the print data converted by the second filter and obtains the print file not converted by the second filter from the storage area.

2. The information processing apparatus according to claim 1, wherein the first filter is configured to receive the print file, and, if in the second mode, delete drawing data from the received print file and transmit the print file from which the drawing data is deleted, to the second filter.

3. The information processing apparatus according to claim 1, wherein the first filter is configured to receive the print file, and, if in the second mode, replace drawing data of the received print file with dummy data and transmit the print file including the dummy data to the second filter.

4. The information processing apparatus according to claim 3,
wherein the first filter is configured to determine whether the accepted mode is the first mode or the second mode based on print setting data, and
wherein the third filter is configured to determine whether the accepted mode is the first mode or the second mode based on whether the print file includes the dummy data.

5. The information processing apparatus according to claim 1, wherein the first filter and the third filter are configured to determine whether the accepted mode is the first mode or the second mode based on print setting data.

6. The information processing apparatus according to claim 1,
wherein the first filter is configured to store a path of the print file in the memory, and
wherein the third filter is configured to obtain the print file from the memory based on the path.

7. The information processing apparatus according to claim 1, wherein, if it is accepted to operate in the second mode, the first filter stores the print file in the memory, and the third filter deletes the print data received from the second filter and obtains the print file from the memory.

8. The information processing apparatus according to claim 1, wherein the second mode is an Extensible Markup Language (XML) Paper Specification (XPS) mode, the first mode is a mode that is different from the XPS mode, and the second filter is configured to generate page description languages of Printer Command Language (PCL) or PostScript (PS) by a V4 printer driver.

9. The information processing apparatus according to claim 1, wherein a plurality of print setting data corresponding to the first, second, and third filters is defined and, in a case where it is accepted to operate in the second mode, the first filter and the third filter cooperate to perform processing of the second filter.

10. The information processing apparatus according to claim 1, wherein in a case where print setting data does not include a setting that corresponds to the first filter, the first filter receives the print data and refrains from performing processing on the print data.

11. The information processing apparatus according to claim 1, wherein the memory is connected between the first filter and the third filter, print setting data that corresponds to the second filter exists, and the second mode relates to a language that describes appearance of a printed page.

12. A control method of an information processing apparatus on which a printer driver configured to process data via a filter runs, the control method comprising:
accepting, using a processor that communicates with a memory, whether to operate in a first mode or a second mode,
wherein, if it is accepted to operate in the first mode, a first filter transmits a print file to a second filter configured to convert the print file into print data, and a third filter receives the print data from the second filter, and
wherein, if it is accepted to operate in the second mode, the first filter stores the print file in a storage area, and the third filter receives from the second filter the print data converted by the second filter and obtains the print file not converted by the second filter from the storage area.

13. The control method according to claim 12, wherein the first filter is configured to receive the print file, and, if in the second mode, delete drawing data from the received print file and transmit the print file from which the drawing data is deleted, to the second filter.

14. The control method according to claim 12, wherein the first filter is configured to receive the print file, and, if in the second mode, replace drawing data of the received print file with dummy data and transmit the print file including the dummy data to the second filter.

15. The control method according to claim 14,
wherein the first filter is configured to determine whether the accepted mode is the first mode or the second mode based on print setting data, and
wherein the third filter is configured to determine whether the accepted mode is the first mode or the second mode based on whether the print file includes the dummy data.

16. The control method according to claim 12, wherein the first filter and the third filter are configured to determine whether the accepted mode is the first mode or the second mode based on print setting data.

17. The control method according to claim 12,
wherein the first filter is configured to store a path of the print file in the memory, and
wherein the third filter is configured to obtain the print file from the memory based on the path.

18. The control method according to claim 12, wherein, if it is accepted to operate in the second mode, the first filter stores the print file in the memory, and the third filter deletes the print data received from the second filter and obtains the print file from the memory.

19. A non-transitory computer-readable storage medium storing computer executable instructions causing a computer to execute a control method of an information processing apparatus on which a printer driver configured to process data via a filter runs, the control method comprising:
accepting, using a processor that communicates with a memory, whether to operate in a first mode or a second mode,
wherein, if it is accepted to operate in the first mode, a first filter transmits a print file to a second filter configured to convert the print file into print data, and a third filter receives the print data from the second filter, and
wherein, if it is accepted to operate in the second mode, the first filter stores the print file in a storage area, and the third filter receives from the second filter the print data converted by the second filter and obtains the print file not converted by the second filter from the storage area.

* * * * *